Oct. 19, 1965   W. L. McCANN   3,212,364
TURRET FOR MACHINE TOOLS
Filed Feb. 15, 1962   7 Sheets-Sheet 1

INVENTOR.
Walter L. McCann,
BY
Wolfe, Hubbard, Voit & Osann
Attorneys.

Oct. 19, 1965 W. L. McCANN 3,212,364
TURRET FOR MACHINE TOOLS
Filed Feb. 15, 1962 7 Sheets-Sheet 2
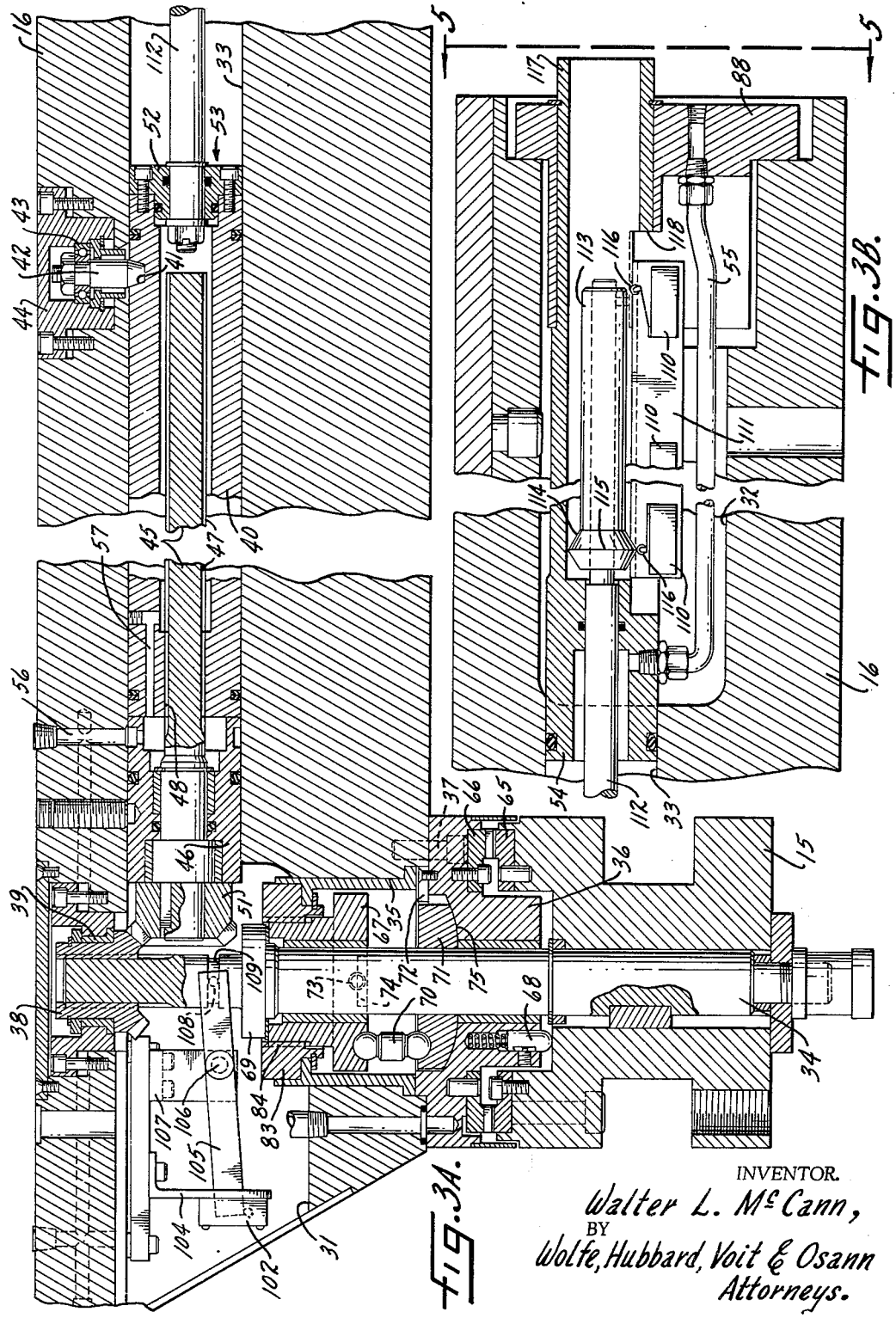
INVENTOR.
Walter L. McCann,
BY
Wolfe, Hubbard, Voit & Osann
Attorneys.

Oct. 19, 1965   W. L. McCANN   3,212,364
TURRET FOR MACHINE TOOLS
Filed Feb. 15, 1962   7 Sheets-Sheet 3
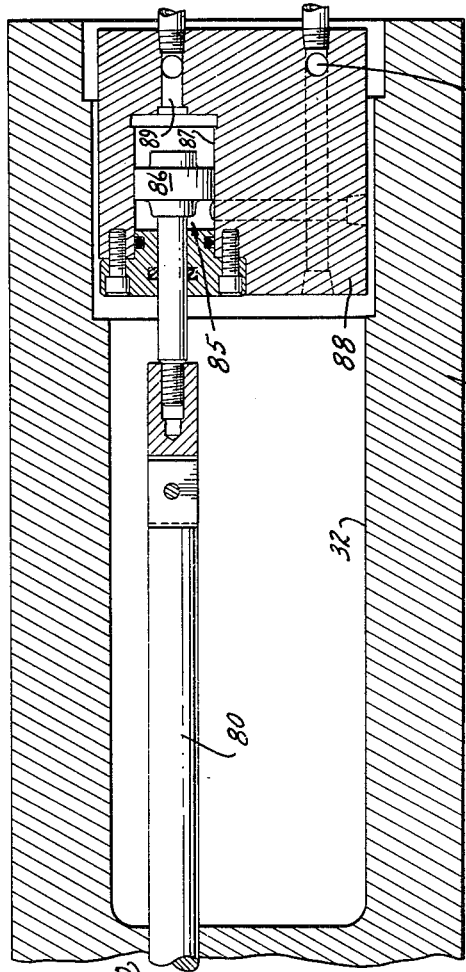
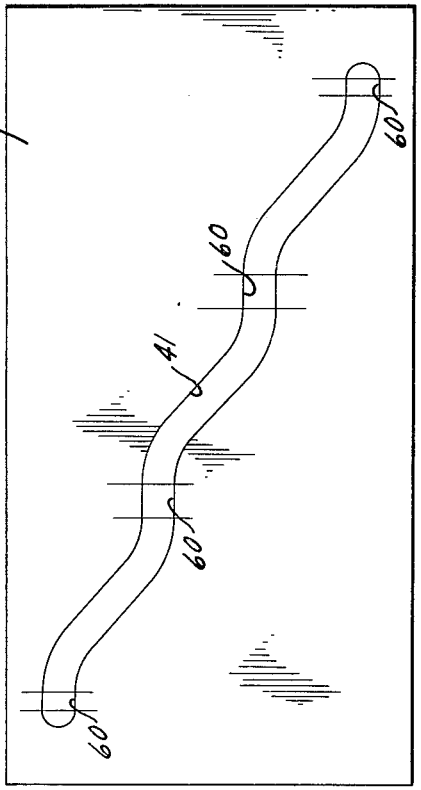
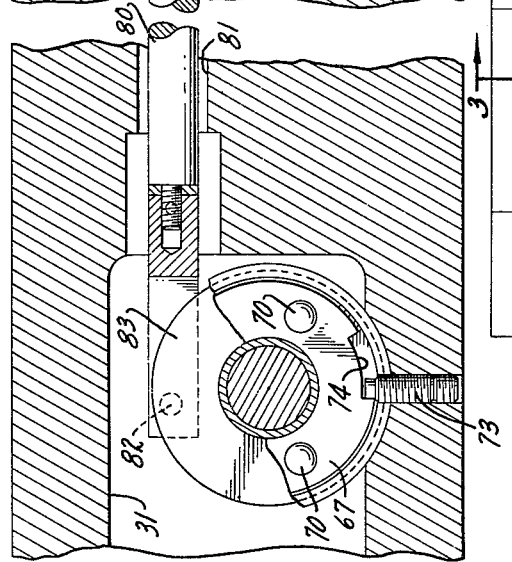
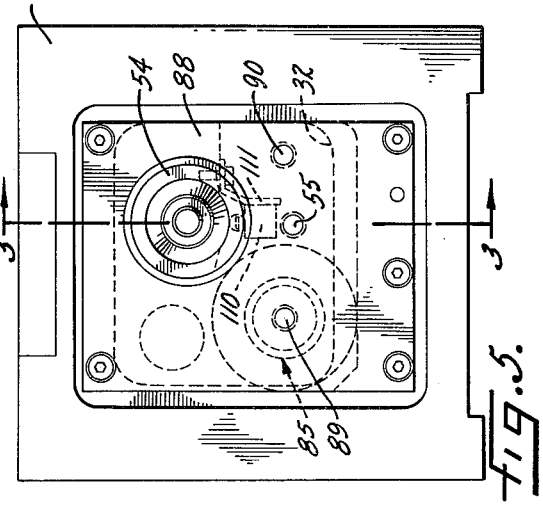
INVENTOR.
Walter L. McCann,
BY
Wolfe, Hubbard, Voit & Osann
Attorneys.

Oct. 19, 1965 W. L. McCANN 3,212,364
TURRET FOR MACHINE TOOLS
Filed Feb. 15, 1962 7 Sheets-Sheet 5
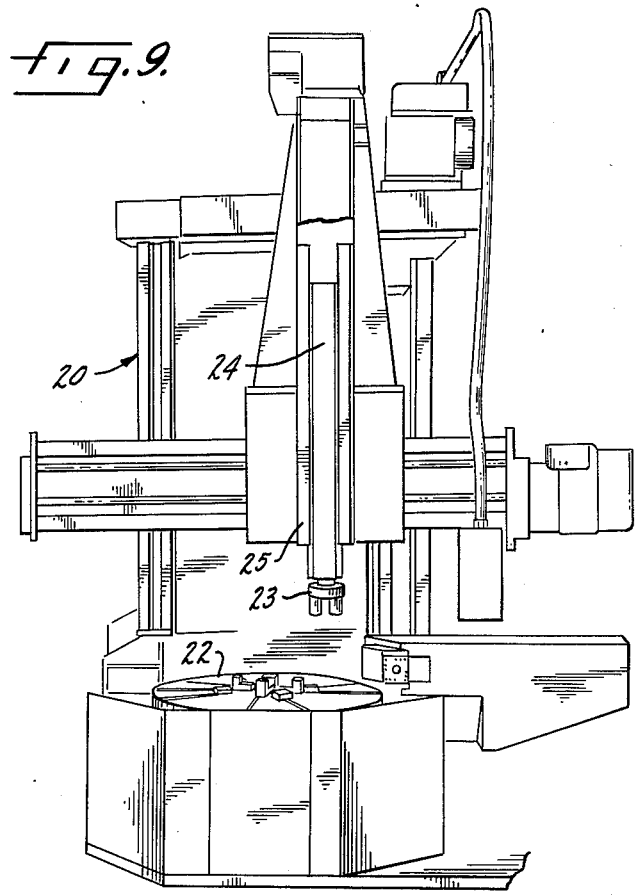
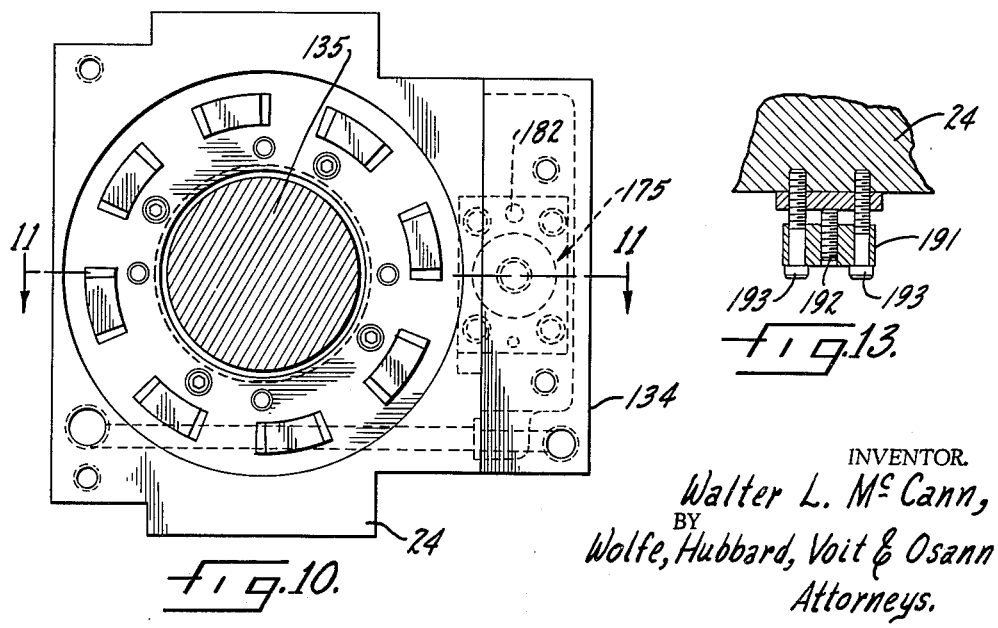
INVENTOR.
Walter L. McCann,
BY
Wolfe, Hubbard, Voit & Osann
Attorneys.

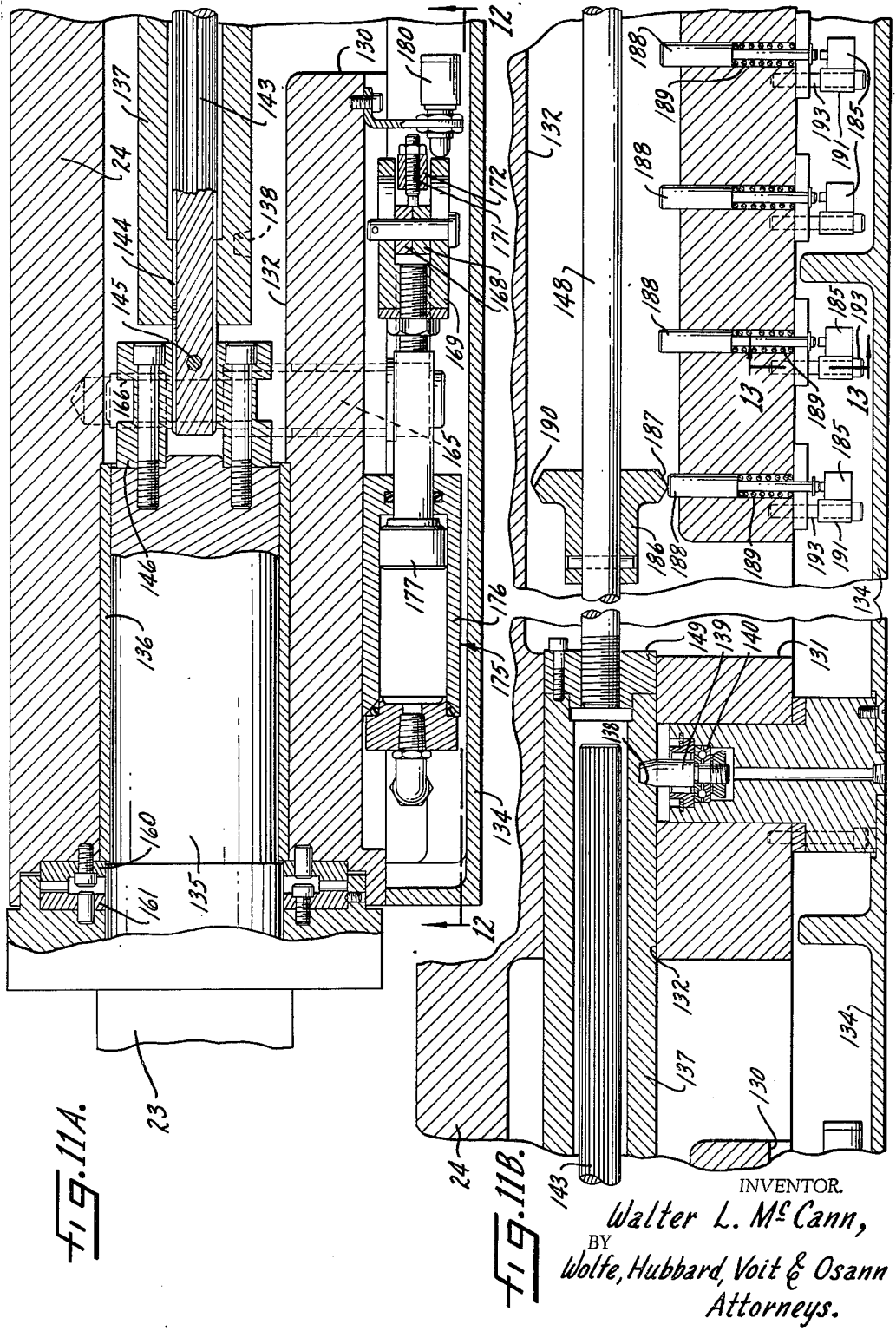

Oct. 19, 1965    W. L. McCANN    3,212,364
TURRET FOR MACHINE TOOLS
Filed Feb. 15, 1962    7 Sheets-Sheet 7
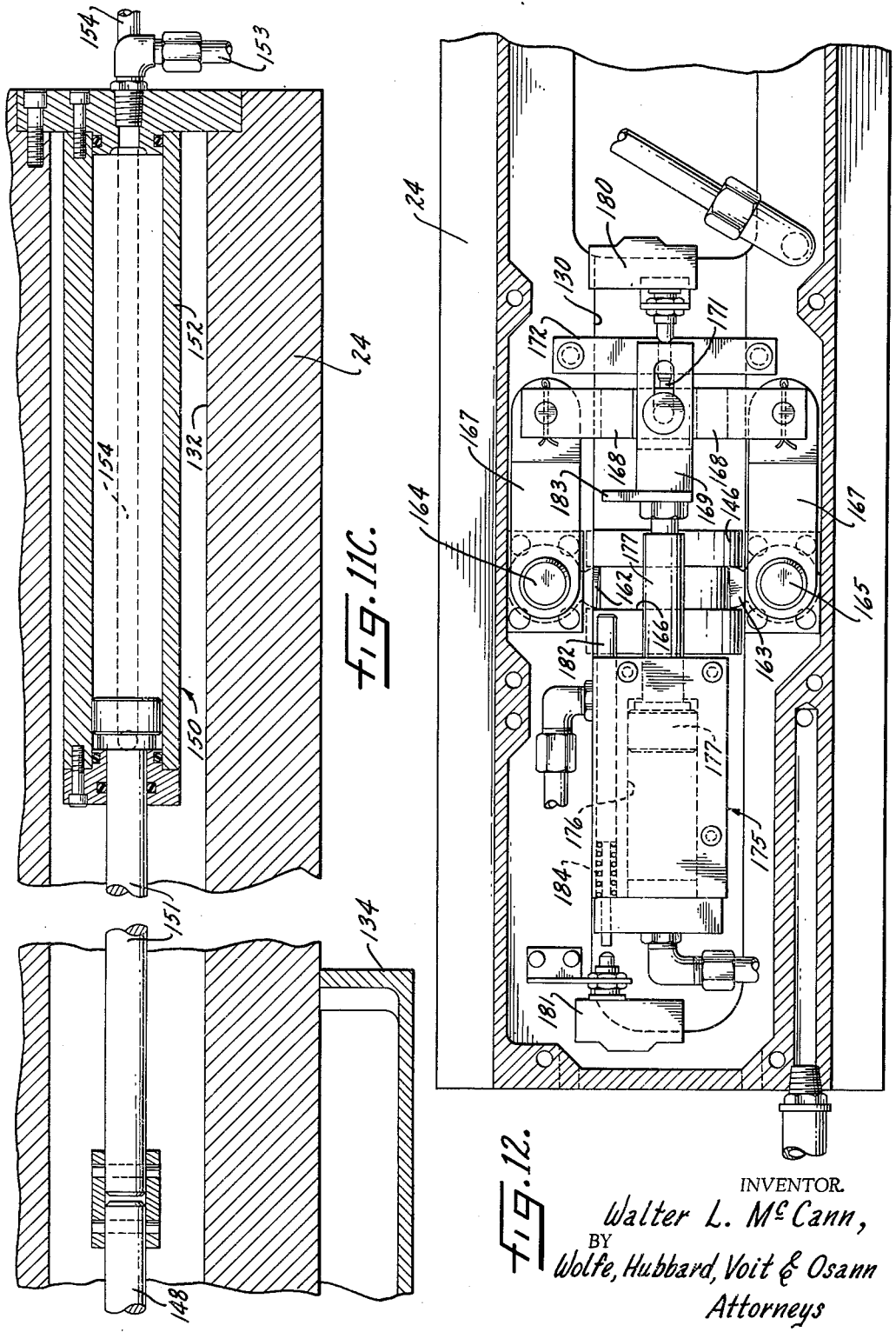
INVENTOR.
Walter L. McCann,
BY
Wolfe, Hubbard, Voit & Osann
Attorneys

United States Patent Office 3,212,364
Patented Oct. 19, 1965

3,212,364
TURRET FOR MACHINE TOOLS
Walter L. McCann, Fond du Lac, Wis., assignor to Giddings & Lewis Machine Tool Company, Fond du Lac, Wis., a corporation of Wisconsin
Filed Feb. 15, 1962, Ser. No. 173,428
8 Claims. (Cl. 74—822)

This invention relates to tool holding turrets for vertical boring mills or similar machine tools and more particularly concerns a turret which is power operated.

Power operating mechanisms have come into common use for positioning the main tool-holding turret in vertical boring mills, turret lathes, and similar machine tools. A commercially successful turret mechanism of this type is shown in United States Patent No. 2,936,656, issued May 17, 1960.

In addition to the main turret, machine tools of this class often include side or auxiliary turrets. While it is desirable to make such side or auxiliary turrets power operated, their relatively small size and the smaller size of their supporting rams makes the power mechanisms used for the large main turret completely unsuitable for this purpose. Indeed, the dimension limitations encountered have heretofore successfully opposed the development of a practical power operating mechanism for side or auxiliary turrets.

In view of the above, it is the primary aim of the invention to provide a completely power operated side or auxiliary turret for a machine tool. More particularly, it is an object to provide such a turret which rotates directly to the position selected and is positively clamped when this selected position is reached.

It is also an object to provide a turret of the above type with a mechanism for accomplishing smooth, shock-free positioning of the turret.

Another object is to provide a power mechanism for a turret as characterized above which is essentially linear in overall conformation so as to be readily received within a relatively slender ram.

A further object is to provide power mechanisms as described above which are practical and efficient for side or auxiliary turrets whose axes are alined with the axis of the main ram as well as those turrets whose axes are transverse to the ram axis, and which mechanism can be embodied in rams having exposed or open sides as well as in those rams that ride in completely surrounding supporting heads.

It is yet another object to provide a turret of the above type which indexes reliably to the exact position desired, without overtravel or coasting, even when the turret supports relatively massive tools which unbalance the turret and add to the inertia of the rotated turret.

Other objects and advantages of the invention will become apparent upon reading the following detailed description and upon reference to the drawings, in which:

FIGS. 3a and 3b are fragmentary sections taken approximately along the line 3—3 in FIG. 2;

FIG. 4 is a fragmentary section taken approximately along the line 4—4 in FIG. 2;

Figure 1:
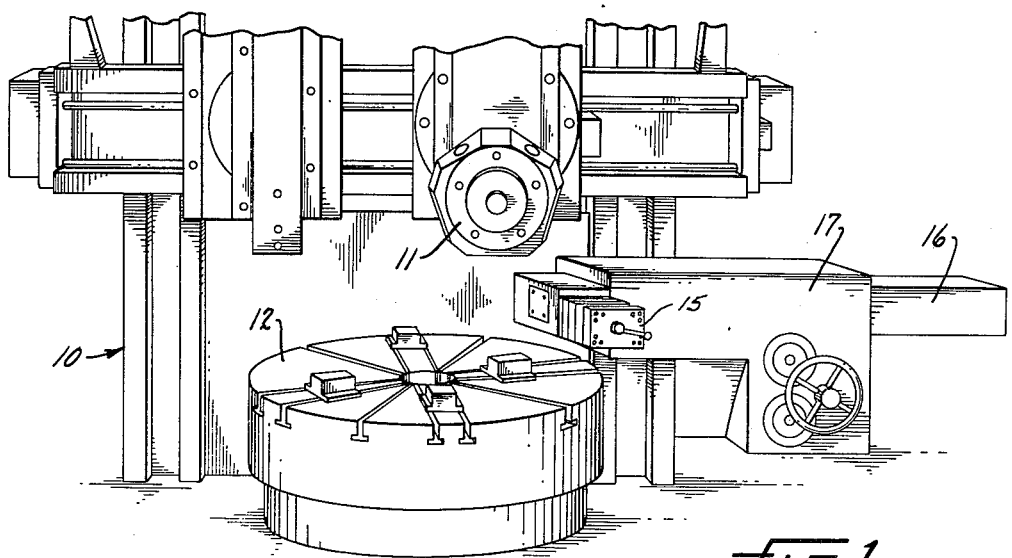
FIGURE 1 is a fragmentary perspective of a machine tool utilizing structure embodying the invention.
Figure 6:
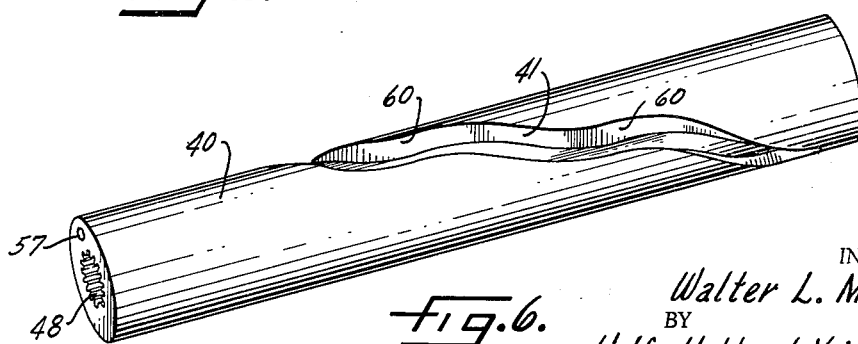
Figure 8:
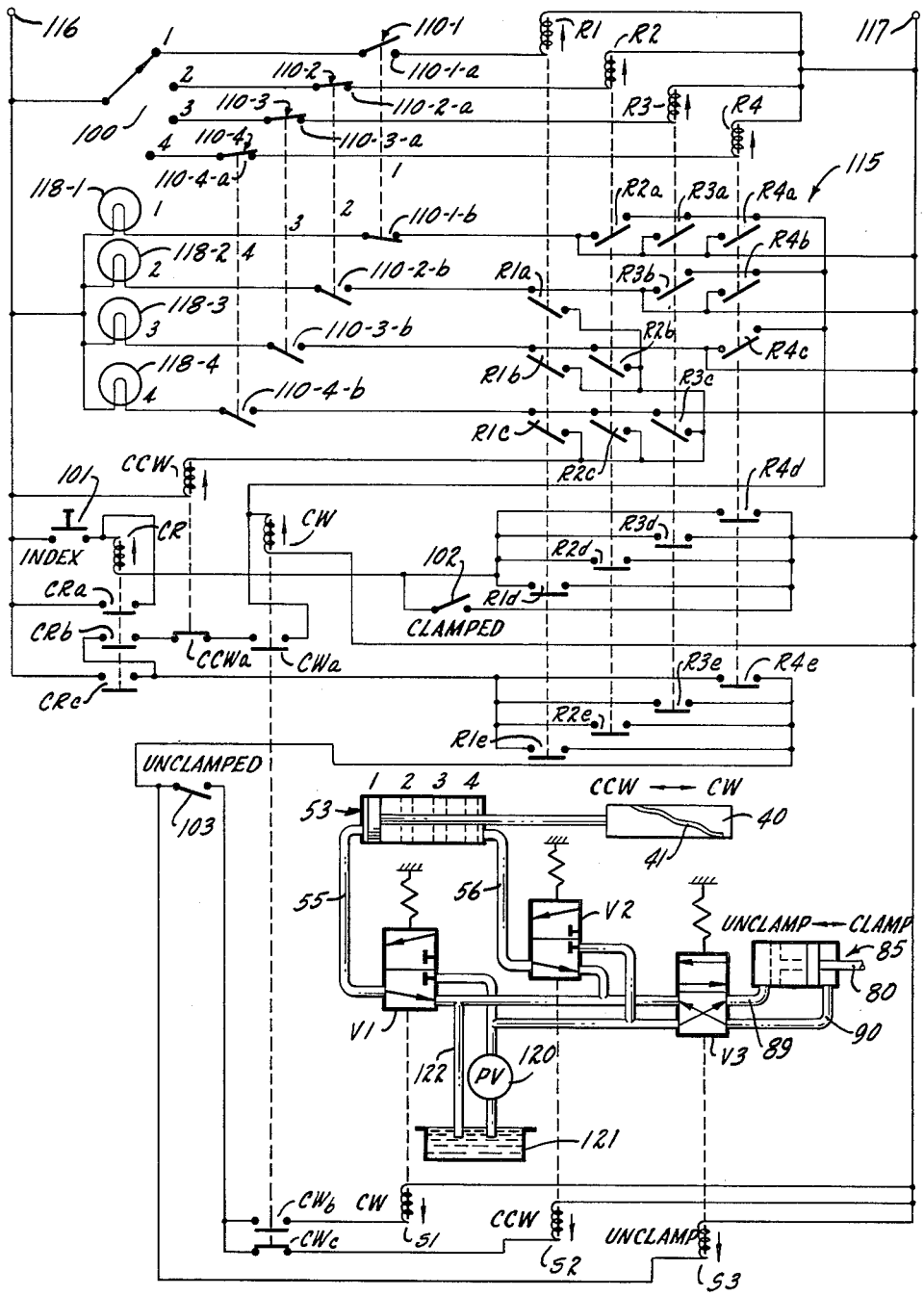

FIG. 5 is an end elevation taken as shown by the line 5—5 in FIG. 3b and includes a line 3—3 indicating the approximate plane along which FIGS. 3a and 3b are taken;

FIG. 6 is a perspective of a cylindrical sleeve cam shown in section in FIG. 3a;

FIG. 7 is a developed view of the surface of the sleeve shown in FIG. 6 illustrating the conformation of the cam groove;

FIG. 8 is a schematic wiring and hydraulic diagram showing the control circuit employed with the tool shown in FIG. 1;

FIG. 9 is a fragmentary perspective of a machine tool which includes a second embodiment of the invention;

FIG. 10 is an enlarged end view as seen from the bottom of the auxiliary turret and supporting ram shown in FIG. 9;

FIGS. 11a, 11b and 11c are fragmentary sections taken approximately along the line 11—11 in FIG. 10;

FIG. 12 is a fragmentary section taken approximately along the line 12—12 in FIG. 11a; and FIG. 13 is a fragmentary section taken along the line 13—13 in FIG. 11b.

While the invention will be described in connection with certain preferred embodiments, it will be understood that I do not intend to limit the invention to those embodiments. On the contrary, I intend to cover all alternatives, modifications and equivalents as may be included within the spirit and scope of the invention as defined by the appended claims.

Turning first to FIG. 1, there is shown a machine tool 10 which those skilled in the art will recognize as a vertical boring mill and which includes a main rotatable turret 11 mounted above a rotatably driven, work supporting table 12. The tool 10 also includes a side or auxiliary turret 15 which is rotatably mounted on a ram 16 that reciprocates in a frame or head 17 forming part of the main frame of the tool 10. The mechanism and control system for rotating the auxiliary turret 15 embody the present invention.

In the tool 10 of FIG. 1, the auxiliary turret 15 is mounted on the side wall of the ram 16 and the ram is completely surrounded by the structure which comprises the supporting head 17. Turning briefly to FIG. 9, a vertical turret lathe 20 is shown having a relatively small main turret 23 overlying a rotatable work supporting table 22. The turret 23 is mounted on a slender ram 24 that is slidably positioned within a frame or head 25. The turret 23 and its ram 24 correspond in overall size and proportion to the above referred to turret 15 and the ram 16 of the tool 10 of FIG. 1. However, it will be noted that the turret 23 shown in FIG. 9 is secured to the end of the ram 24, rather than the side of the ram as is the turret 15, and that the head 25 embraces only three sides of the ram 24 so that the forward side of the ram is exposed. As mentioned above, the ram 16 is completely enclosed within the head structure 17. The mechanism for rotating the turret 23 on the ram 24 constitutes a second embodiment of the invention and is discussed in detail below.

Returning to the tool 10, and particularly FIGS. 3a and 3b, the ram 16 is preferably a single solid structure having opposite end cavities 31 and 32 connected by a cylindrical bore 33. The turret 15 is keyed on a shaft 34 that passes through an opening 35 so that the shaft extends into the cavity 31. The shaft 34 is journalled in a cap 36 that is secured by a plurality of bolts 37 to the side of the ram 16 so as to close the opening 35. The rear portion of the shaft 34, that is, that portion farthest from the turret 15, is splined within a bevel gear 38 that is journalled in a bearing 39 mounted in the back wall of the ram cavity 31. Thus, rotation of the bevel gear 38 rotates the shaft 34 and the turret 15.

Pursuant to the invention, a cylindrical sleeve cam 40 is slidably mounted in the ram bore 33 so as to rotate when moved axially, and provision is made for rotatably coupling the cam with the turret 15 and for hydraulically shifting the cam axially. To cause the cam 40 to rotate upon being moved axially, the cam is provided with a generally helical peripheral groove 41 which receives a cam follower 42 that is anchored in the ram 16 so as to project into the bore 33 and the groove 41. In the illustrated construction, the cam follower 42 is rotatably mounted in a bearing 43 that is locked in a cap 44 which is received within a similarly formed recess in the back wall of the ram 16. Mounting the cam follower 42 in the cap 44 permits easy installation and convenient removal for servicing. As will be apparent, the anchored cam follower 42 forces the cam 40 to rotate as the cam moves axially, with the direction of rotation depending on the direction the cam is moved linearly.

To rotatably couple the cam 40 to the turret 15, a shaft 45 is journalled in a plug member 46 that is fixed in, and closes, the end of the bore 33 adjacent the cavity 31. The shaft 45 is formed with a splined portion 47 which extends into the bore 33 and is rotatably locked at 48 with corresponding splined portions formed within the cam 40. Rotation of the cam 40 thus rotatably drives the shaft 45, and the elongated splined portion 47 permits the cam 40 to shift axially relative to the shaft 45.

A bevel gear 51 is keyed to the end of the shaft 45 which extends into the cavity 31, and the gear 51 meshes with the gear 38 with the result that the cam 40 is rotatably coupled to the turret 15.

For hydraulically shifting the cam 40 axially within the bore 33, the cam carries an end member 52 so as to form a hydraulic actuator indicated generally at 53. That is, the cam 40 with its end member 52 defines a piston which reciprocates within a hydraulic cylinder defined by the ram bore 33. The plug member 46 is sealed within one end of the bore 33 so as to hydraulically close that end of the actuator 53, and a closure member 54 is fixed to the ram and sealed within the opposite end of the bore 33 so as to seal that end of the actuator 53. A hydraulic line 55 (see FIG. 3b) directs fluid under pressure to one side of the actuator piston defined by the end member 52 and a hydraulic line 56 (see FIG. 3a), together with a passage 57 in the cam 40, directs hydraulic fluid under pressure to the opposite side of the actuator defined by the cam 40 and the end member 52. It will thus be apparent that transmission of fluid under pressure through the line 55 causes the cam 40 to be driven toward the right in FIG. 3a, whereas the admission of fluid under pressure to the line 56 drives the cam in the opposite direction. Because of the cooperation of the cam follower 42 in the generally helical peripheral groove 41, such axial movement of the cam 40 results in rotation of the cam so as to cause the turret 15 to rotate in clockwise and counterclockwise directions.

In the embodiment illustrated, the turret 15 has four positions arranged to present four separate tools alternately to a workpiece on the table 12. In order to insure smooth, shock-free positioning of the turret into any one of its four alternate positions, the cam groove 41 is formed with four spaced, axially disposed dwell portions 60 which correspond to the alternate turret positions (see FIG. 7). It will be apparent that as the cam follower 42 moves along the groove 41 into one of the dwell portions 60, rotation of the cam will be temporarily interrupted due to the axial disposition of the dwell portion. This means that the turret 15, while being rotated by the cam 40, will slow its rate of rotation and come to a temporary halt as the cam follower 42 moves into one of the dwell portions 60. The turret thus comes to a smooth shock-free stop in one of its alternate positions. Similarly, initial movement of the cam 40 accelerates the turret 15 at a gradual rate, without abruptness, as the cam follower 42 moves out of the dwell portion 60 in which it was resting and into a helical portion of the groove 41. It will be apparent that each one of the dwell portions 60 corresponds to one of the alternate positions for the turret 15.

For releasably clamping the turret 15 in its alternate positions, a pair of interlocking clamp rings 65 and 66 having interfitting teeth are mounted on the turret 15 and the cap 36, respectively. The turret 15 is locked against axial movement on the shaft 34 and the shaft is axially shiftable so as to carry the clamp ring 65 away from the ring 66 and thus free the turret for rotation or, alternatively, to draw the clamp rings together so as to interfit their opposed teeth and thus lock the turret against rotation. This form of turret clamp is known to the art and a form thereof is shown in the United States patent identified above.

The shaft 34 is axially shifted to control clamping of the turret 15 by a toggle ring 67 which acts in opposition to a plurality of biasing pins 68 of which only one pin is illustrated. The pins 68 are embedded in the cap 36 and are resiliently urged so as to bear on the turret 15 and urge it away from the ram 16, thus tending to separate the clamp rings 65, 66. The toggle ring 67 is seated against a collar 69 on the shaft 34 and is coupled by a plurality of links 70 (see also FIG. 4) to an annular base plate 71 which is seated in the cap 36 and keyed thereto at 72 against rotation. Rotation of the ring 67 tends to straighten the links 70 into parallel relation to the shaft 34 thus tending to separate the toggle ring 67 from the base plate 71, with the result that the ring bears against the collar 69 and shifts the shaft 34, together with the turret 15, toward the ram 16 against the biasing force of the pins 68.

A stop 73 is anchored within the ram 16 and extends into an arcuate groove 74 formed in the periphery of the toggle ring 67 so as to define limit positions between which the toggle ring may be rotated. To equalize the forces exerted by the toggle links 70, the base plate 71 is provided with a spherical load bearing surface 75 that mates with a correspondingly formed surface on the cap 36. The base plate 71 may, therefore, rock slightly so that the forces exerted by straightening out the toggle links 70 are equalized about the axis of the shaft 34.

In keeping with the invention, the turret 15 is clamped and unclamped by a clamp shaft 80 disposed axially of the ram 16 in a bore 81 which extends between the cavities 31, 32. One end of the shaft 80 is pinned at 82 to a collar 83 that is splined at 84 to the toggle ring 67. The other end of the shaft 80 is secured to the movable element of an actuator 85 which is defined by a movable piston 86 shiftably received in a cylinder 87 formed in an end block 88 that closes the rear open end of the cavity 32. A passage 89 provides hydraulic fluid to the cylinder 87 on one side of the piston 86 so as to drive the shaft 80 to the left in FIG. 4 and clamp the turret. A second passage 90 admits hydraulic fluid under pressure to the left-hand side of the piston 86 as seen in FIG. 4 so as to move the shaft 80 toward the right, resulting in slight rotation of the toggle ring 67 so as to tilt the toggle links 70 and allow the biasing pins 68 to unclamp the turret.

Figure 2:
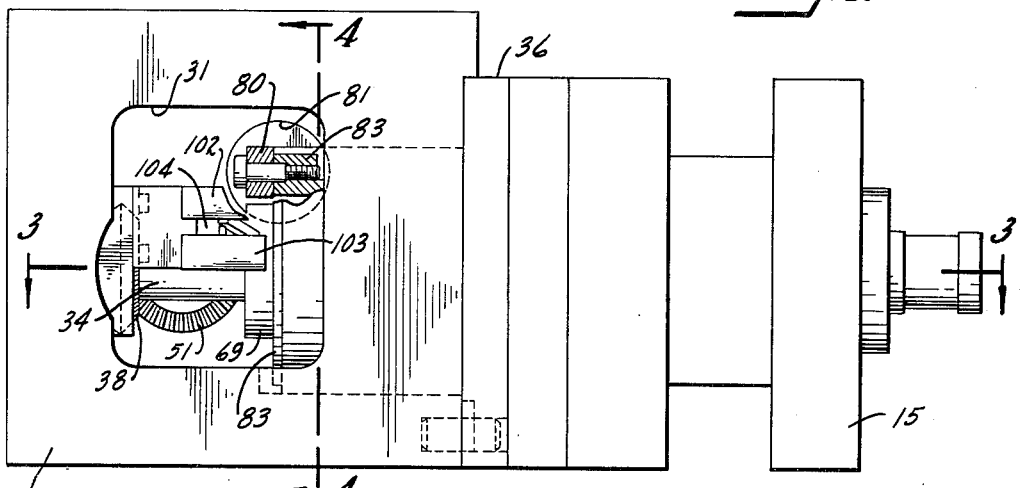
FIG. 2 is an enlarged end elevation of the side or auxiliary turret and supporting ram of the tool shown in FIG. 1.

Further in accordance with the invention, a control system is provided for unclamping the turret 15, driving the turret directly to a selected position, and reclamping the turret, all upon operation of a selector switch 100 and an index switch 101 (see FIG. 8). To sense whether the turret is clamped or not, the control circuit includes a pair of switches 102 and 103, shown in circuit in FIG. 8, which are physically secured to a bracket 104 within the cavity 31 (see FIGS. 2 and 3a). The switches are actuated by an arm 105 which is pivoted at 106 on a support 107 also secured to the inner wall of the cavity 31. One end of the arm 105 carries a pin 108 which is received within an annular groove 109 formed in the turret shaft 34. It can thus be seen that axial shifting movement of the shaft 34 results in swinging of the arm 105. In the illustrated embodiment the switch 102 is normally closed and is opened by the arm 105 when the turret 15 is in its clamped position. The switch 103 is normally open and is closed by the arm 105 when the turret 15 shifts outwardly to its unclamped position.

To sense the position of rotation of the turret 15, a control circuit includes four limit switches 110 which have been further labeled in FIG. 8 as 110–1, 110–2, 110–3 and 110–4 so as to designate the limit switch which is operated when the turret is in each of its four respective positions. The limit switches 110 are physically mounted on a bracket 111 within the cavity 32 and are disposed in spaced relation along the axial path of travel of a shaft 112 that is secured to the cam 40 through the end member 52. The shaft 112 projects through the closure member 54 and carries a collar 113 having an annular projection 114. The projection 114 operates the respective limit switches 110 upon axial movement of the shaft 112 which, of course, occurs in conjunction with axial movement of the cam 40.

As a feature of the invention, the projection 114 has a uniform and symmetrical axial cross section so as to define an annular ridge 115 which cooperates with operators 116 for each of the limit switches 110. The symmetrical conformation of the ridge 115 insures that operation of each one of the limit switches 110 coincides with a single axial position of the cam 40 without regard to the rotational disposition of the cam or its direction of movement. That is, the operators 116 are always depressed to operate their associated switches 110 at the same point in the axial travel path of the projection 114, whether the projection is being moved to the right or to the left, and without regard to the rotation of the projection as it is turned in unison with the cam 40.

To support the projection 114 for true axial movement, the projection preferably rides snugly but slidably in a cylindrical portion 117 of the closure member 54. An opening 118 is formed in the side wall of the cylindrical portion 117 to permit the limit switch operators 116 to project into the path of travel of the projection 114.

Turning next to the control circuit, the selector switch 100 and the limit switches 110 control a plurality of relays R1, R2, R3 and R4 forming part of a logic circuit 115 which selectively energizes either a clockwise control relay CW or a counterclockwise control relay CCW depending upon the direction the turret 15 must be rotated to reach the newly selected position. To this end, the switch 100 and contacts 110–1–a, 110–2–a, 110–3–a and 110–4–a of the switches 110 are connected in series with the relays R1 to R4, respectively, across a set of power source terminals 116 and 117. The "a" contacts of the limit switches 110 are normally closed and are opened when operated so that, in FIG. 8 with the turret 15 in position No. 1, only the switch 110–1 is shown in operated condition. The limit switches also embody a second set of contacts 110–1–b, etc., that are normally open and which are closed when the respective switch 110 is operated.

Each of the relays R1 and R4 includes three sets of contacts with contacts R1–a, R1–b and R1–c being controlled by the relay R1 and similarly identified contacts being controlled by the other relays. The relay contacts a, b and c are coupled to the control relays CW and CCW across the terminals 116, 117 through the limit switch contacts 110–1–b, etc., in a matrix arrangement. The nature of these connections can be best seen by briefly reviewing a phase of the control circuit's operation. As stated above, FIG. 8 indicates the condition of the circuit when the turret has been rotated to its position No. 1 so that only the limit switch 110–1 is operated. The selector switch 100 is in its position No. 1 but the open contacts 110–1–a prevent energization of the relay R1. Position No. 1 for the turret 15 is its furthermost counterclockwise position.

Upon swinging the selector switch 100 to either its second, third, or fourth position, it will be seen that a respective one of the relays R2, R3 or R4 is picked up through one of the closed sets of contacts 110–2–a, 110–3–a or 110–4–a. Picking up of any one of the relays R2, R3 or R4 energizes the clockwise control relay CW through the closed contacts 110–1–b and one of the sets of contacts R2–a, R3–a or R4–a. In a manner to be described below, this causes movement of the turret in a clockwise direction. Thus, it can be seen that the turret is moved clockwise no matter how the selector switch 100 is manipulated when the turret starts in its far counterclockwise, No. 1 position.

As another illustration, it may be assumed that the turret is in its No. 3 position with the selector switch also in its No. 3 position. Under these conditions, the limit switch 110–3 is operated so that the contacts 110–3–a are open and the contacts 110–3–b are closed. Movement of the selector switch to its No. 4 position picks up the relay R4 through the then closed contacts 110–4–a so as to energize the clockwise control relay CW through the contacts R4–c and the then closed contacts 110–3b. As a result, the turret is driven further in a clockwise direction to its final No. 4 position. Alternatively, if the selector switch 100 is turned back to its No. 1 position, the relay R1 is picked up so that the counterclockwise control relay CCW is energized through the contact R1–b and the then closed contacts 110–3–b. As will be explained below, this conditions the turret 15 for rotation in a counterclockwise direction back toward its No. 1 position. It may thus be seen that the logic circuit 115 couples the selector switch 100 and the limit switches 110 so as to condition either the relay CW or the relay CCW for causing the turret to be rotated in the required direction to the selected position.

As a convenience to the operator, the control system includes a plurality of indicator lamps 118–1, 118–2, etc. which are connected in series with the contacts b of the limit switches 110. In this manner a corresponding one of the lights 118 is lit upon the operation of one of the limit switches and the closing of the corresponding set of contacts b so as to visually indicate the position in which the turret has come to rest.

The index switch 101 operates an indexing circuit which includes a control relay CR that operates three sets of contacts CR–a, CR–b and CR–c. The relay CR is connected across the terminals 116, 117 in series with the index switch 101, the clamp switch 102, and sets of contacts R1–d, R2–d, R3–d and R4–d controlled by the respective relays R.

The control relay contacts CR–a are connected to seal in the relay CR once it is picked up. The control relay contacts CR–b and CR–c are effective to seal in the relay CW, when the latter is picked up, through normally closed contacts CCW–a of the relay CCW and seal in contacts CW–a of the relay CW.

The control relay contacts CR–c are also in series with a group of parallel connected contacts R1–e, R2–e, R3–e and R4–e and three valve operating solenoide S1, S2 and S3. The solenoid S3 operates a turret clamp valve V3 and is connected directly across the terminals 116, 117 through the contacts CR–c and R1–e, etc. The solenoids S1 and S2 operate clockwise and counterclockwise movement controlling valves V1 and V2, respectively, and are connected through the turret unclamping sensing switch 103 to the relay contacts e and the control relay contacts CR–c.

The relay CW operates second and third sets of contacts CW–b and CW–c so as to condition either the solenoid S1 or the solenoid S2 for operation. The contacts CW–c are normally closed and are in series with the solenoid S2. Therefore, if the relay CW is not picked up, the solenoid S2 is conditioned for operation. The contacts CW–b are normally open and are in series with the solenoid S1. Thus, energization of the relay CW closes the contacts CW–b and conditions the solenoid S1 for operation.

The hydraulic portion of the control circuit includes a fluid pump 120 which delivers hydraulic fluid under pressure from a sump 121 to the valves V1, V2 and V3. A return line 122 is provided from the respective valves for exhausting fluid back to the sump 121.

The valves V1, V2 and V3 are spring positioned solenoid operated valves and are illustrated in their normal nonactuated positions. When so disposed, the valves V1 and V2 vent opposite ends of the actuator 53 to the sump 121 so that the actuator 53 remains inactive and the cam 40 stationary. When in nonoperated position, the valve V3 connects the line 89 to the pump 120 and the line 90 to the sump 121 so as to drive the actuator 85 in the turret clamping direction thus normally maintaining the turret 15 in clamped condition.

It will be seen that energization of the solenoid S1 operates the valve V1 so that fluid under pressure is directed from the pump 120 to the left side, in FIG. 8, of actuator 53 with the result that the cam 40 is driven to the right in the direction which is effective to produce clockwise rotation of the turret 15. Conversely, energization of the solenoid S2 operates the valve V2 so that fluid from the pump 120 drives the actuator 53 to the left in FIG. 8 to move the cam 40 in the direction required to produce counterclockwise rotation of the turret 15. Energization of the solenoid S3 operates the valve V3 so as to couple the line 89 to the sump 121 and the line 90 to the pump 120 thus causing the clamp shaft 80 to be driven in its turret unclamping direction.

The interrelation of the above described control circuit can best be appreciated by briefly reviewing a single cycle of operation. As has been previously stated, FIG. 8 indicates the position of the parts when the turret 15 is at rest in its No. 1 position. The selector switch 100 is also in its No. 1 position and the limit switch 110–1 is operated by the turret so that the contacts 110–1–a are open. The contacts 110–1–b are, however, closed so that the indicator light 118–1 is illuminated to visually indicate the position of the turret. Since the turret is clamped, the switch 102 is operated and open, and the switch 103 is unoperated and also open. The cam 40 and the associated actuator 53 are also in their No. 1 positions and the clamping actuator 85 is held in its fully clamped position.

Turning the selector switch 100 to position No. 3 energizes the relay R3 through the closed contacts 110–3–a. This energizes and picks up the relay CW through the contacts R3–a and 110–1–b and the circuit is conditioned for indexing the turret clockwise from its No. 1 to its No. 3 position.

The index switch 101 is then operated so as to energize the control relay CR through the then closed contacts R3–d. The relay CR is sealed in through its own contacts CR–a. The energized relay CW is sealed in through the contacts CR–c, CR–b, CCW–a and CW–a.

Closing the contacts CR–c also energizes the solenoid S3 through the then closed contacts R3–e. Energization of the solenoid S3 operates the valve V3 so that the actuator 84 unclamps the turret 15, with the result that the switch 102 is no longer operated and closes. When the turret reaches its fully unclamped position, the switch 103 is operated to complete a circuit through contacts CR–c, R3–e and then closed contacts CW–b so as to energize the solenoid S1. This operates the valve V1 with the result that the actuator 53 is operated to drive the cam 40 in the direction required to rotate the turret 15 in a clockwise direction.

As soon as the turret leaves its No. 1 position, the limit switch 110–1 is no longer operated so that the contacts 110–1–b open to extinguish the indicator lamp 118–1. Closing of the contacts 110–1–a has no effect on the circuit since the selector switch 100 is then in its No. 3 position.

When the turret reaches its No. 3 position, the switch 110–3 is operated so as to close the contacts 110–3–b and illuminate the indicator light 118–3. Also, the contacts 110–3–a open with the result that relay R3 drops out and its associated contacts open. However, the control relay CR remains held in through the then closed turret clamp switch 102 and thus the relay CW also remains picked up. Opening of the contacts R3–e does deenergize solenoids S1 and S3 with the result that movement of the actuator 53 is halted and the clamping actuator 85 is operated to reclamp the turret in its No. 3 position. As soon as the turret is clamped, the switch 102 opens to drop out the control relay CR and thus restore the circuit to its nonoperated condition.

It is important to note that actuation of the turret clamping device occurs substantially simultaneously with interruption of the turret drive. The clamp rings 65, 66 thus engage before the turret has a chance to coast past the selected position. The turret is therefore positioned reliably and accurately with no overtravel caused by turret inertia or unbalance.

It will be appreciated that if the situation calls for counterclockwise movement of the turret, the logic circuit 115 energizes the relay CCW so that the contacts CCW–a are opened thus preventing energization of the relay CW and maintaining the contacts CW–c in their normally closed condition. As a result, closing of the switch 103 in the indexing cycle of the control circuit energizes the solenoid S2 and causes counterclockwise movement of the turret.

Turning next to the form of the invention embodied in the vertical turret lathe 20, and with particular reference to FIGS. 10 to 13, it can be seen that the ram 24 is a solid member having side cavities 130 and 131 which open into a longitudinally extending bore 132. Since the support or head structure 25 does not embrace the front of the ram 24, removable covers 134 are releasably secured over the cavities 130 and 131. Removal of these covers gives access to the working parts of the turret indexing mechanism.

The turret 23 is secured to a shaft 135 that is journalled in a bearing 136 fitted into the forward end of the ram bore 132. In this embodiment, the axis of the turret shaft 135 is alined with the axis of the ram 24.

For rotating the turret, a cylindrical cam 137 is slidably mounted in the bore 132 for both axial and rotational movement. So as to rotate the cam 137 upon axial movement of the cam, a generally helical peripheral groove 138 is formed in the cam and cooperates with a cam follower 139 which is anchored in the ram 24. In the illustrated construction, the cam follower 139 is journalled in a bearing 140 carried in a mounting plug 141 that is fitted into the side wall of the ram.

To rotatably couple the cam 137 to the turret 23, an elongated splined shaft 143 is splined at 144 within the cam 137 and is secured by a pin 145 to a collar 146 that is screwed securely into the end of the turret shaft 135. Rotation of the cam 137 is thus directly imparted to the splined shaft 143 which in turn is locked, through the pin 145 and the collar 146, to the turret shaft 135. Rotation of the cam 137 therefore rotates the turret 23.

For hydraulically shifting the cam 137 axially, a shaft 148 is anchored in an end member 149 secured to the rear end of the cam 137 and the shaft is coupled to an actuator 150 positioned within the rear end of the ram bore 132. The actuator 150 includes a piston 151 which moves within a cylinder 152 and is coupled directly to the cam shaft 148. A line 153 supplies hydraulic fluid under pressure to the right-hand side of the piston 51, and a line 154 supplies hydraulic fluid under pressure to the opposite side of the piston.

The turret 23, like the turret 15, has four alternate angular positions so that the peripheral cam groove 138 formed in the cam 137 is preferably shaped as is the groove 41 in the cam 40 described above. Operation of the actuator 150 axially shifts the cylindrical cam 137 so as to rotate the turret 23 between its alternate positions in the same manner as rotation of the cam 40 is effective to position its associated turret 15.

For clamping the turret 23, a pair of interlocking clamping rings 160 and 161 are secured to the end of the ram 24 and the rear side of the turret 23, respectively. The shaft 135 on which the turret 23 is mounted is axially shiftable within the bearing 136 so that movement of the shaft to the left in FIG. 11a separates the clamp rings 160, 161, to unclamp the turret. Return movement of the shaft 135 to the position illustrated in FIG. 11a reengages the axially extending teeth on the clamp rings 160, 161 so as to reclamp the turret 23.

The shaft 135 is shifted axially by a pair of rocking fingers 162 and 163 carried by cross shafts 164 and 165, respectively, which are journaled transveresly within the ram 24. The rocking fingers 162, 163 extend into a peripheral groove 166 formed in the collar 146 so that swinging movement of the fingers 162, 163 is effective to axially shift the collar 146 and the shaft 135.

The cross shafts 164, 165 are rocked to swing their associated fingers 162, 163 by a toggle linkage including arms 167 coupled by a pair of links 168 to a thrust bar 169. With the thrust bar 169 positioned against a stop 171 carried on a bracket 172, the links 168 are straightened out so as to spread the arms 167 apart and hold the cross shafts 164, 165 in the angular position required to cause the rocking fingers 162, 163 to draw the turret 23 into clamped position. Shifting of the thrust bar 169 to the left in FIGS. 11a and 12 causes the links 168 to jackknife and pull the arms 167 together, thus rocking the cross shafts 164, 165 and causing the fingers 162, 163 to carry the turret shaft 135 toward the left in these fingers sufficiently far to unclamp the turret 23.

To operate the thrust bar 169 and thus clamp and unclamp the turret 23, an actuator 175 is mounted on the ram 24 within the cover 134. The actuator 175 includes a cylinder 176 which carries a piston 177 that is directly coupled to the thrust bar 169.

To sense whether the turret 23 is clamped or not, a pair of switches 180 and 181 are mounted on the ram 24 within the cover 134 so that the switch 180 is directly engaged by the thrust bar 169 when the bar is in abutment with the stop 171. The switch 180 is thus operated when the turret is clamped. The switch 181 is acted upon by a rod 182 slidably positioned in a bore formed in the cylinder 176 of the actuator 175. A stop 183 is carried by the thrust rod 169 so as to engage the rod 182 when the parts have shifted sufficiently far to unlock the turret 23. Engagement of the stop 183 with the rod 182 shifts the rod against the force of a biasing spring 184 into contact with the operator of the switch 181 so that the switch 181 is operated when the turret 23 is unclamped.

To sense the positions of th eturret, four limit switches 185 are spaced along the path of travel of the shaft 148. A collar 186 having an annular projection 187 is secured to the shaft 148 so as to operate the limit switches 185 through biased pins 188 set in the side of the ram 24. The pins 188 are biased inwardly toward the shaft 148 by helical springs 189. The projection 187 is formed so as to define a symmetrical annular ridge 190 which engages and shifts the pins 188, thus operating the associated switches 185, upon movement of the cam 137 in either direction.

To adjust precisely the points at which the cam 137 causes operation of the limit switches 185 along the path of travel of the cam, despite the fixed positions of the operator pins 188, the switches 185 are adjustably mounted relative to the ends of their respective pins 188. For this purpose, each of the switches 185 is secured to a block 191 which carries an adjusting screw 192 and a pair of tightening screws 193. The screws 193 draw the block 191 toward the surface of the ram 24 a distance that is determined by the setting of the adjustment screw 192 (see FIG. 13). It can thus be seen that manipulation of the screws 192, 193 is effective to shift the blocks 181, and thus the limit switches 185, toward and away from the ends of the operating pins 188. This permits the distance the pins 188 must be moved by the projection 187 to operate the switches 185 to be accurately controlled and this adjustment, in turn, permits exact selection of the points at which the drive for the cam 137, and thus rotation of the turret 23, is halted.

Those skilled in the art will appreciate that the exemplary conrol circuit shown in FIG. 8 in association with the turret 15 and its associated mechanisms is equally well adapted for indexing the turret 23. The actuators 150 and 175 obviously correspond to the actuators 53 and 85 described in connection with the FIG. 8 control circuit. Similarly, it will be apparent that the limit switches 185 correspond to the previously described limit switches 110, and that the switches 180 and 181 are analogous to the switches 102 and 103, respectively.

In summary, it may be seen that there has been provided a power operated side or auxiliary turret for a machine tool despite the critical size limitations imposed by the relatively small rams on which such turrets are mounted. The compact structure of the invention is largely due to the essentially linear disposition of the parts so that both the turret actuating mechanism and the turret clamping mechanism can be received within a relatively small diameter ram. The novel control circuit associated with the indexing mechanisms described above provides for automatic turret unclamping, direct turret drive to the newly selected position, and automatic reclamping. The turret drive is smooth and shock-free.

I claim as my invention:

1. In a machine tool, the combination comprising, a substantially solid ram, a turret rotatably mounted at one end of said ram, a turret clamp for locking said turret against rotation on said ram, a first linear hydraulic actuator disposed longitudinally within said ram and coupled to said clamp for operating the same, a second linear hydraulic actuator disposed longitudinally within said ram, means for converting linear to rotary motion coupling said second actuator and said ram so that linear movement of said second actuator is accompanied by corresponding rotation of said turret, and a plurality of limit switches disposed along the linear path of travel of said second actuator for sequential operation thereby, said switches being effective to interrupt the linear movement of said second actuator when activated and thus establish alternate angular positions for said turret corresponding to the linear position of said second actuator.

2. In a machine tool having a turret rotatably mounted on a ram, the combination comprising, a cylindrical cam slidably mounted for axial and rotatable movement in said ram, said cam and said ram being connected by a generally helical groove and a cam follower disposed in said groove, a shaft coupling said turret and said cam for rotation, said turret and said ram having mating teeth for positively preventing relative rotation, a clamp shaft disposed axially of said ram, means coupling said shaft to said turret so that axial movement of the shaft shifts the turret axially to separate said teeth and free the turret for rotation, a hydraulic actuator for selectively shifting said shaft in an axial direction so as to release and reclamp said turret, and means for hydraulically driving said cam back and forth in an axial direction so as to rotate and selectively position said turret when the latter is unclamped.

3. In a machine tool having a turret rotatably mounted on a ram, the combination comprising, a cylindrical cam slidably mounted for axial and rotatable movement in said ram, said cam having a generally helical peripheral groove with spaced axially disposed portions, a cam follower disposed in said groove and anchored on said ram, a shaft coupling said turret and said ram for rotation, means for driving said cam back and forth in an axial direction so as to rotate and selectively position said turret, a plurality of limit switches spaced along the linear path of movement of said cam, said limit switches being effective to interrupt said driving means, and means coupled to said cam for actuating successive ones of said switches when the cam moves axially so as to halt said follower in one of said axially disposed groove portions.

4. A machine tool comprising, in combination, a ram, a turret rotatably mounted on said ram, a cylindrical cam slidably mounted for axial and rotatable movement in a bore formed in said ram, a shaft rotatably coupling said turret and said ram, means for rotating said cam upon axial movement thereof, said cam being fitted in fluid sealing relationship within said bore, and hydraulic lines for selectively delivering fluid to opposite sides of said cam so as to drive the cam axially.

5. A machine tool comprising, in combination, a ram, a turret rotatably mounted on said ram, a hollow cylindrical cam slidably mounted for axial and rotatable movement in a bore formed in said ram, a shaft coupled for rotation with said turret and splined within said hollow cam, means for rotating said cam upon axial movement thereof, said cam being fitted in fluid sealing relationship in said bore, and hydraulic lines for selectively delivering fluid to opposite sides of said cam so as to drive the cam axially.

6. A control system for a clampable turret having a clamp controlling shaft and a positionable element for moving said turret when unclamped comprising, in combination, a first actuator for operating said clamp shaft, said actuator being normally operative to clamp said turret, a second actuator coupled to said turret and having a first operator for causing said second actuator to move the turret in one direction and a second operator for causing said second actuator to move the turret in the opposite direction, a selector switch having positions corresponding to the alternate positions of said turret, a plurality of limit switches arranged so that a different switch is operated when the turret is in each of said positions, means defining a logic circuit coupling said selector switch and said limit switches to condition either said first or said second operator for actuation depending upon the direction said turret must rotate to move from the position it is in to the position for which the selector switch is set, and an indexing circuit for energizing said first actuator to unclamp the turret and then energizing the operator which has been conditioned for operation.

7. A control system for a rotatable turret having an oscillatable element for rotating said turret comprising, in combination, an actuator having a first operator for causing said actuator to drive said element in one direction and a second operator for causing said actuator to drive said element in the opposite direction, a selector switch having positions corresponding to the alternate angular positions of said turret, a plurality of limit switches arranged so that a different switch is operated when the turret is in each of said angular positions, means defining a logic circuit coupling said selector switch and said limit switches to condition either said first or said second operator for actuation depending upon the direction said element must be driven to rotate the turret from the position it is in to the position for which the selector switch is set, and an indexing circuit for energizing the operator which has been conditioned for operation and maintaining the conditioned operator energized until the turret rotates to operate the limit switch corresponding to the position at which said selector switch is set.

8. A control system for a rotatable turret having a shaft for operating a turret clamp and an oscillatable element for rotating said turret when unclamped comprising, in combination, a first actuator for operating said clamp shaft, said actutaor being normally operative to clamp said turret, a second actuator having a first operator for causing said second actuator to drive said element in one direction and a second operator for causing said second actuator to drive said element in the opposite direction, a selector switch having positions corresponding to alternate angular positions of said turret, a plurality of limit switches arranged so that a different switch is operated when the turret is in each of said angular positions, means defining a logic circuit coupling said selector switch and said limit switches to condition either said first or said second operator for actuation depending upon the direction said element must be driven to rotate the turret from the position it is in to the position for which the selector switch is set, and an indexing circuit for energizing said first actuator to unclamp the turret and then energizing the operator which has been conditioned for operation, said indexing circuit including means for maintaining the turret unclamped and the conditioned operator energized until the turret rotates to operate the limit switch corresponding to the position at which said selector switch is set.

References Cited by the Examiner

UNITED STATES PATENTS

| | | | |
|---|---|---|---|
| 1,016,750 | 2/12 | King | 74—107 X |
| 2,578,559 | 12/51 | Korsgren | 74—57 X |
| 2,902,889 | 9/59 | Trechsel | 74—823 |
| 2,940,341 | 6/60 | Diener | 74—824 |
| 2,947,186 | 8/60 | Greenwald | 74—107 |
| 3,029,672 | 4/62 | Lowenborg | 74—128 X |
| 3,101,013 | 8/63 | Ayers | 74—818 |

BROUGHTON G. DURHAM, *Primary Examiner.*

DON A. WAITE, *Examiner.*